Nov. 8, 1949   V. E. PRATT ET AL   2,487,476
FILM FEEDING DEVICE
Filed March 5, 1947   2 Sheets-Sheet 1
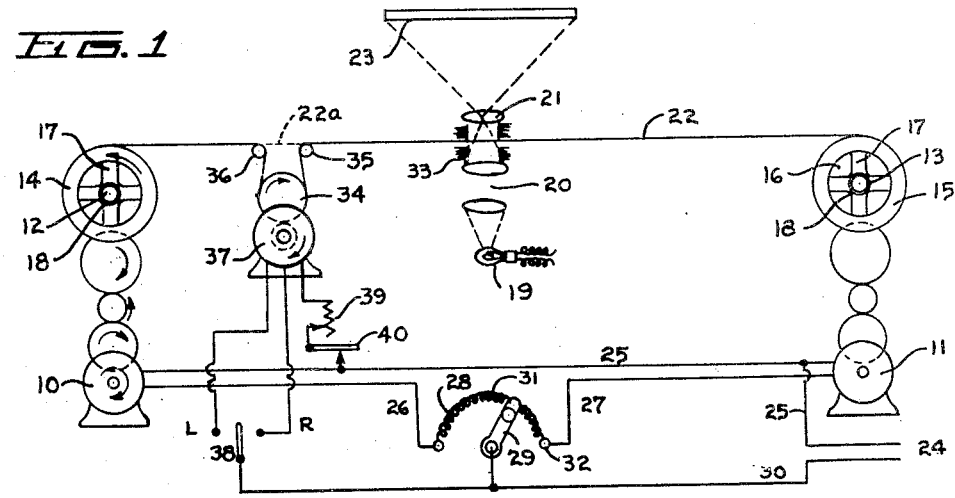
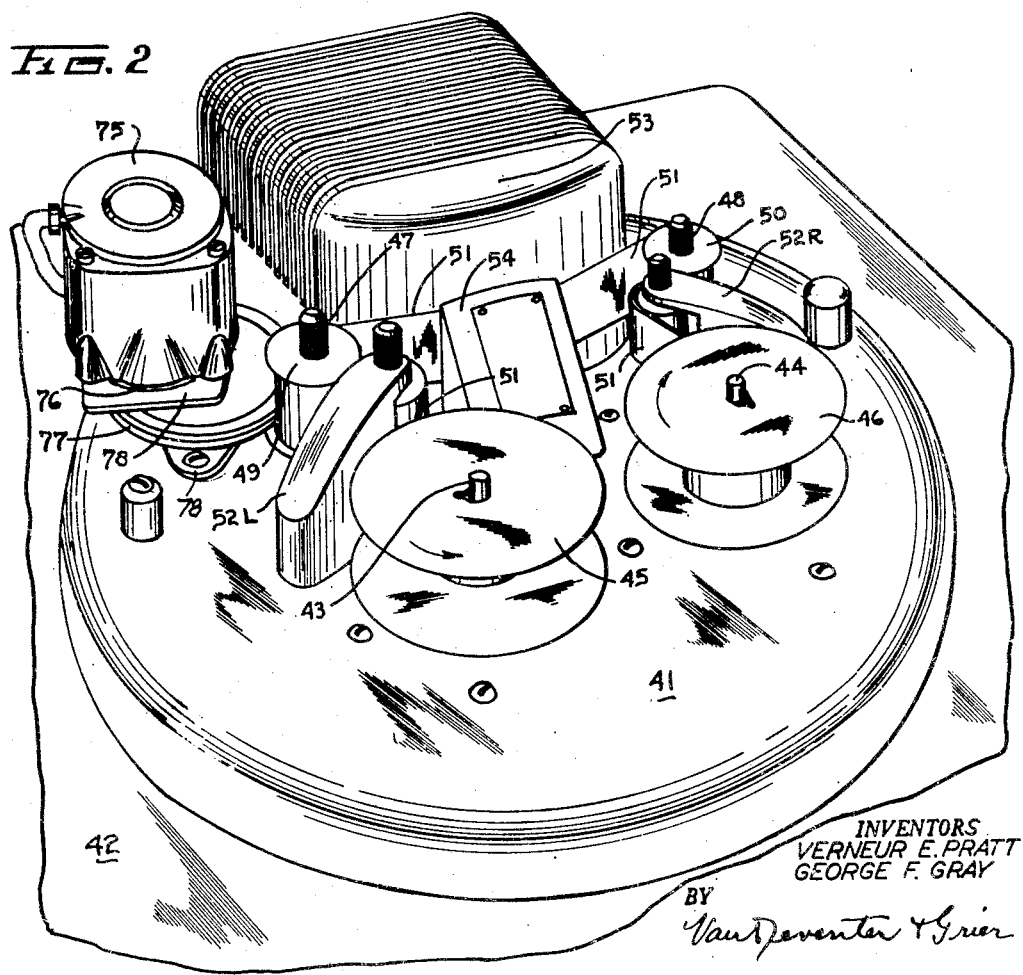
INVENTORS
VERNEUR E. PRATT
GEORGE F. GRAY
BY
Van Deventer & Grier
ATTORNEYS Nov. 8, 1949　　V. E. PRATT ET AL　　2,487,476
FILM FEEDING DEVICE
Filed March 5, 1947　　2 Sheets-Sheet 2
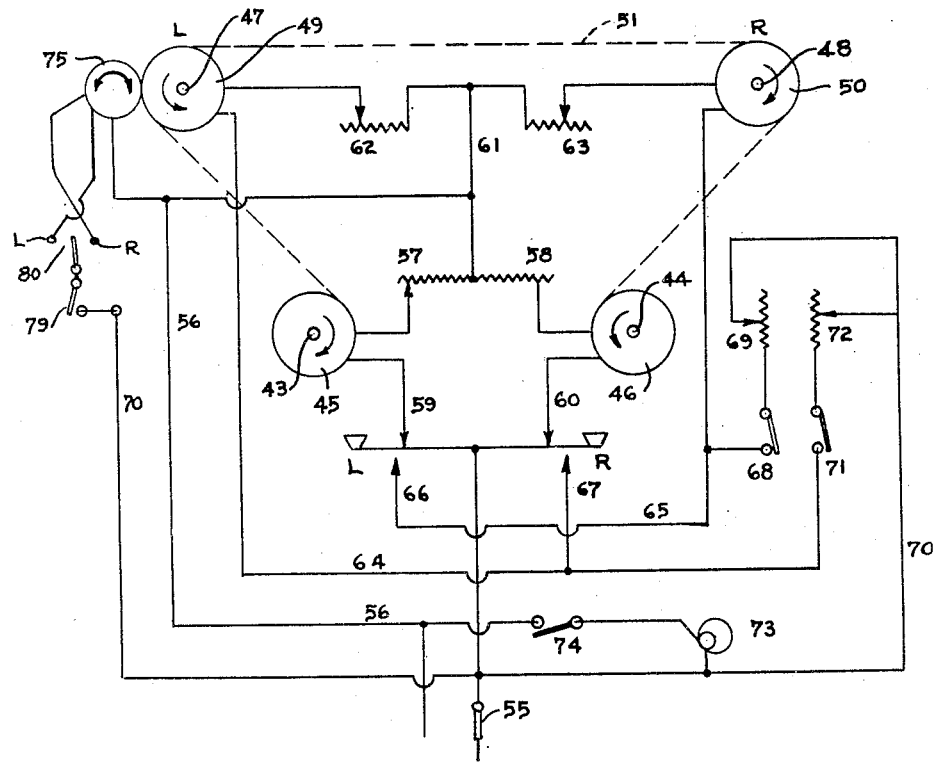
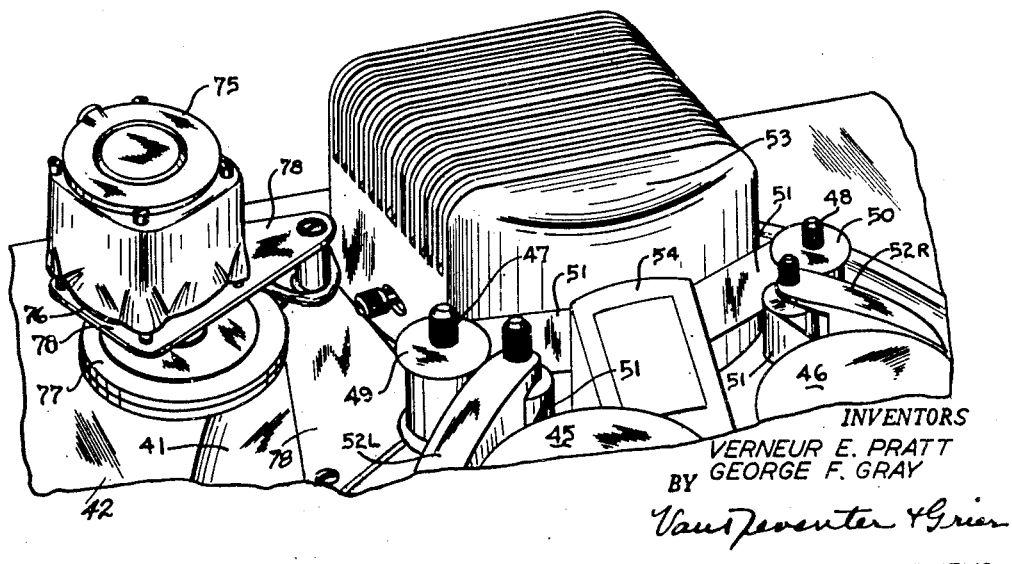
INVENTORS
VERNEUR E. PRATT
GEORGE F. GRAY
BY
Van Deventer & Grier
ATTORNEYS Patented Nov. 8, 1949

2,487,476

UNITED STATES PATENT OFFICE 2,487,476

FILM FEEDING DEVICE

Verneur E. Pratt and George F. Gray, Norwalk, Conn.

Application March 5, 1947, Serial No. 732,446

6 Claims. (Cl. 88—28)

1

This invention relates to a film feeding device and more particularly to such devices as shown and described in the U. S. Patent No. 2,412,551 dated December 10, 1946, and entitled "Film feeding devices" and the co-pending application for U. S. Patent Serial Number 718,378, filed December 26, 1946 entitled "Projector."

An object of the invention is to provide an improved film feeding device.

Another object is to provide a slow-motion attachment for a film feed as described in the aforesaid patent.

Another object is to provide slow-motion film feed for a projector as described in the aforesaid application for patent.

Another object is to provide a simple and efficient film feed having few parts of comparatively inexpensive construction and in which gearing is eliminated.

A further object is to provide a film feed employing an auxiliary motor, said auxiliary motor producing the slow-speed motion of the film without the necessity of adjusting the controlling resistance or other speed regulating device associated with the motor or motors normally operating the film feed.

All of the foregoing objects are more fully hereinafter referred to, together with other objects and advantages in connection with the following description of preferred embodiments of the invention by way of illustration. It will be understood, however, that many variations in the described construction can be made without, however, departing from the invention as defined by the appended claims.

In the accompanying drawings:

Figure 1 is a diagram illustrating the application of the invention to a film feeding device as shown in the aforesaid patent;

Figure 2 is a perspective view of the turret head described in the aforesaid application to which the instant invention has been applied;

Figure 3 is a wiring diagram of the apparatus shown in Figure 2; and

Figure 4 is a view of the apparatus shown in Figure 2 with the auxiliary motor 75 in non-operating position.

Referring to Figure 1, the motors 10, 11 drive the reel shafts 12, 13 at any desired speed and in opposite directions. The shafts 12, 13 support the winding members or film reels 14, 15. The gearing diagrammatically indicated may be omitted and the reels driven directly by the motor shafts. For the sake of illustration reel 14 may be considered as the delivery reel from which film is wound, and 15 is the take-up reel.

Each reel has a pad 16 against which a spring 17 presses adjustably secured to the shaft by nut 18. This forms a friction clutch which permits the reel to slip under excessive load.

2

In the path of the film, from one reel to the other is located the usual light source 19 and lenses 20, 21 adapted to project an image from film 22 to screen 23.

The film 22 will first be considered as extending directly from reel 14 to reel 15 as indicated at the dotted line 22a.

A current supply circuit 24 has a conductor 25 connected to motors 10, 11 which are connected to run in opposite directions. These motors connect via conductors 26, 27 to a resistance or inductance 28 having a contact arm 29 connected to conductor 30 of the supply circuit. The resistance 28 is of such characteristics that when the arm 29 is at the midpoint 31 thereon, both motors will receive equal amounts of current and therefore will be operating at substantially the same speeds and torque, the latter varying slightly dependent upon the difference in the load on the reels 14, 15.

Now, by varying the position of contact arm 29, either motor can be made to overcome the other. For example, if arm 29 is moved to the point 32, the motor 11 will be directly across the current supply 24 with none of the resistance 28 in circuit, and all of this resistance will be in circuit with motor 10. The result will be that motor 11 will drive the reel 15 to take the film from the reel 14, motor 10 acting as a brake on 14 and thereby keeping the film tight in the lens opening or film gate 33.

The foregoing film drive and modifications thereof are more fully described in the aforementioned patent.

Obviously, there is a limit to the reduction in speed that can be gained by the above described arrangement. If a very slow speed of film traverse is required, (with a given motor and resistance 28), the movement of the film may be jerky and uncertain.

The instant invention overcomes this difficulty and makes it possible to move the film as slowly as desired and without the necessity of varying resistance 28 from its normal setting where set for ordinary operation. This is accomplished by providing a feed roller 34 and the guide rollers 35, 36. The film 22 is looped around roller 34 as shown, instead of extending from reel to reel as indicated at 22a.

The roller 34 is driven at any desired speed by motor 37 which may be a reversing motor adapted to run in either direction depending upon the position of switch 38, the motor turning roller 34 clockwise if said switch is on L to move film 22 to the left and anticlockwise with switch on R to move film 22 to the right.

A variable resistance or inductance 39 is inserted in the motor circuit to permit regulating the speed of the motor and a switch 40 controls the motor in the usual way.

If the arm 29 is adjusted so that the motors 10, 11 tend to rotate in opposite directions, the film 22 will be tensioned therebetween, and will not move across the optical path of lens 21.

If now the push button switch 40 is closed, (switch 38 being on L), the motor 37 will be energized and the roller 34 driven thereby will drive film slowly to the left towards reel 14 upon which it will be wound by motor 10. Motor 37 therefore, assists motor 10 and the combined tension on the film 22 produced by said motors 10 and 37 is sufficient to overcome the clockwise torque of motor 11 which acts as a brake on the film 22 keeping same taut across the optical path of the lens and in contact with the feed roller 34.

By moving switch 38 to R, the operation just described is reversed (by reversing the direction of rotation of motor 37 and roller 34 is driven thereby. The film now traverses to the right, and is wound on reel 15 by motor 11, motor 10 acting as the brake.

Thus the film may be moved in either direction without adjusting the motors 10, 11 or the controls therefore. Also, by varying the resistance 39 the traversing speed can be varied as desired.

Resistance 28 may be adjusted to give a fast rewind from reel 15 to reel 14 by motors 10, 11 and then a slow traverse from reel 14 to reel 15 by using motor 37 without the employment of gearing, the motors 10, 11 being directly connected to shafts 12, 13 as described in connection with traversing motors, in the copending application before mentioned.

The application of the invention to the film feeding device of the above-mentioned patent having been described, the invention will now be disclosed as applied to a film feed wherein four motors are employed as shown and described in the co-pending application heretofore referred to.

In the accompanying Figure 2, a projector head is shown as fully described in the aforesaid copending application. For the purpose of illustrating the application of the instant invention thereto it may here be pointed out that the projector includes a rotatable turret head 41 mounted on top of a suitable cabinet 42 in which there is a screen like that shown at 23 Figure 1. Secured to the underside of the head 41 are a pair of take-up motors the shafts of which are shown at 43, 44, said shafts being adapted to receive the usual film reels 45, 46 which are rotated thereby.

The motors driving shafts 43, 44 rotate in opposite direction so that 43 may revolve anti-clockwise, and 44 clockwise.

A pair of traverse or take-up motors are secured to the underside of head 41 and drive the shafts 47, 48 on which are mounted the feeding rollers 49, 50. The shaft 47 rotates anti-clockwise and the shaft 48 clockwise.

The film 51 is taken from reel 46 around the tensioning device 52r, round the feed roller 50 and across the front of the casing 53 containing the light source (such as a lamp and the usual condensing lenses therefor) and between that and a lens system mounted in the casing 54 (said system being adapted to reflect the emergent beam downwardly to be projected on the screen in the cabinet 42), and then round the feed roller 49 and the roller of the tensioning device 52l and wound up on reel 45.

It will be seen that the motors having shafts 47, 48 comprise a film feeding means and that motors having shafts 43, 44 comprise reeling means for the film.

It will also be observed that if the shafts 47, 48 are revolved in opposite directions, and the torque on one shaft, say 47 is greater than the torque on the other, that the film 51 will be kept stretched against the film gate or other support forming the front of the casing 53, and the film will slowly move to the left.

If now the motor connected to shaft 43 is energized, the film fed to the left by feed roller 49 will be wound up on reel 45.

If the shaft 48 driving feed roller 50 has greater torque than the shaft 47, then the film will be wound off reel 45 and to the right, Figure 2 and if the motor driving shaft 44 is energized, the film so fed will be wound up on reel 46.

The foregoing operation will be clear from the circuit diagram Figure 3. The motors are indicated diagrammatically and it will be understood that the feeding or traverse motors are connected to the shafts 47, 48 and the winding or take-up motors are connected to the shafts 43, 44.

If the main switch 55 is closed, it will be seen that a circuit exists, via conductor 56 to the junction of a pair of adjustable resistances, inductances or other suitable control devices 57, 58, in series with the winding motors, which are connected to the other side of the main circuit, via the normally closed contacts 59, 60 of a suitable push-button switch L, R.

By adjusting the control means 57, 58 the winding motors can be adjusted to wind in either direction and to oppose each other to any extent desired.

It will also be noted that the feeding motors driving shafts 47, 48 are connected to one side of the main circuit by conductors 56, 61, via the control means 62, 63, return circuits from these motors being completed via conductors 65, 64 to normally open contacts 66, 67 of the push-button switches before mentioned.

When push-button switch R is pressed and contact 67 is closed thereby, the circuit through the feeding motor driving shaft 47 is completed, and that motor is energized to wind the film 51 to the left. This causes the projected image from the film to move to the right.

When push-button R is pressed, it will be noted that the contact 60 is broken and therefore the winding motor driving the take-up reel 46 is de-energized; however the winding motor driving reel 45 remains energized, and therefore the film wound to the left, as just described, will be wound up on reel 45.

When the push-button L is pressed, the operation just described is reversed and film 51 is then moved to the right and wound up on reel 46 in a manner that will be obvious.

Occasionally, especially when editing film, it is desirable for the operator to be able to have the images slowly traverse the screen of the reader without having to operate the push-buttons R, L, and this may be accomplished by properly adjusting the control devices 57, 58 in order to provide that one or the other of the winding motors will have sufficiently greater torque to take up film wound in the direction of that motor. The desired motors are then connected to the main circuit as previously described, except that instead of operating the push-button R, for example, the switch 68 is closed, and the circuit completed via the variable resistance or other control means 69 and conductor 70.

A similar switch and resistance indicated at 71, 72 respectively, is provided for the right hand feeding motor driving shaft 48, so that the film may be slowly fed in either direction and wound up on the proper take-up reel 45 or 46 depending upon the adjustment of the resistances 57, 58.

The projector lamp 73 may be controlled by a switch 74 and connected across the main circuit as shown.

While the foregoing arrangement provides for traversing the film slowly (the winding motors, for example, the right hand one, having resistances 68, 69 in series therewith), it has been found that when the speed of the traverse of the film is very slow, that the action may become jerky unless comparatively large feeding motors and resistances for controlling them are employed.

It is, of course, desirable to keep the motors and resistances as small and compact as possible so that the entire reading machine may be contained in a compact cabinet and be as light and as inexpensive as possible.

Accordingly, in order to secure a very slow traversing of the film with the use of comparatively small and inexpensive resistances, an auxiliary motor, such as indicated at 75 may be employed.

Such motors are in common use and contain a gear reduction which is located in the one end of the motor casing at 76 through which the motor drives a wheel 77 which may have a felt or rubber rim. The motor may be connected directly across the power circuit 56, 70 in series with a simple push switch.

The entire motor assembly is mounted on a swinging bracket 78 of any suitable construction whereby the motor may be swung inwardly as shown in Figure 2, so that the rim of the motor driving wheel 77 may engage some part of the feed roller 49 or the film 51 thereon in order to drive the film. When the motor 75 is not used, it may be swung outwardly into the position shown in Figure 4, where it no longer engages the film-feeding mechanism.

Obviously, two motors like that shown at 75 can be used, one to engage the left hand feed roller 49 and another (not shown) on the other side of the turret to engage the feed roller 50. Instead of engaging the feed rollers, the motors may engage the film on either of the rollers or in any other manner to move the film.

When two motors like 75 are used, they may run in one direction only, and may be swung in and out of operating position as previously described.

A single auxiliary motor which will operate in either direction may be used, and such a reversible motor is shown in connection with the diagram Figure 3. It may be mounted on the bracket 78 as previously described.

Here a switch 79 is provided in series with a switch 80, whereby the motor can be connected across the main circuit 56, 70.

If the switch 79 is closed and switch 80 is placed on contact R, the motor 75 may revolve anti-clockwise, and if switch 80 is moved to contact L, the motor will revolve clockwise. In other words, closing the switch 80 on its contacts R, L, will move the film in the same direction as pressing the push-buttons R, L, operating contacts 60, 67 and 59, 60 respectively.

Assuming that it is desired to move the film to the right, the switch 79 being closed and switch 80 being thrown to contact R, the driving wheel 77 of motor 75 will slowly revolve thereby moving the film 51 to the right. If the switch 80 is thrown to its contact L, then the film will move to the left.

Switch 80 can be a push-button switch.

Regardless of whether the motor 75 runs in one or both directions, it will be observed that many combinations of this motor with the other motors indicated in the diagram Figure 3 can be made to obtain practically any operating condition met with in connection with the equipment of the character described, and particularly met with in readers for microfilm.

For example, if auxiliary motor 75 is used alone to drive film to the right, then obviously the motor driving reel 45 would be suitably adjusted by rheostat 58 to wind up the film delivered to that reel, and likewise, the motor connected to reel 45 would be suitably adjusted via the rheostat 57 to maintain the film taut. If desirable, the auxiliary motor 75 could be aiding the motor driving reel 46 and might be opposing the motor driving reel 45 or the latter motor need not be used at all. Or button L to close contacts 66 could be depressed, and the feeding motor driving feed roller 50 could be adjusted to aid auxiliary motor 75 in winding film to the right, and if this arrangement was used, it would also be possible to operate the motor driving the feed roller 50 without pressing the button to close contact 66 by merely closing switch 68 and adjusting the resistance 69.

It will be seen from the above illustrative examples of how the equipment can be used, that it is possible to effect a large number of combinations between the two feeding motors, the two winding motors, and/or the auxiliary motor, as none of these are mechanically interconnected, each one being arranged so that the torque thereof may be individually adjusted.

It is possible to further adjust the torque of the auxiliary motor 75 by inserting any suitable control device such as a variable resistance in circuit therewith as, for example, in series with the conductor 70 and this resistance (not shown) may be adjusted similar to the resistances 57, 58 previously described.

A study of the diagram Figure 3 will reveal a large number of combinations that can be made of the different motors to wind film in either direction and apply thereto different tensions while same is being traversed or wound.

What is claimed is:

1. In combination, a rotatable turret plate, a lens mounted on said plate, film feeders having rotatable shafts extending through said plate, motors supported on the underside of said plate and connected to said shafts to drive the same, reeling devices for each of said feeders mounted on the upper side of said plate and having rotatable shafts extending therethrough, motors supported on the underside of said plate and connected to said last shafts to drive the same whereby film moved past said lens by said feeders may be wound off one of said reeling devices and on to the other of said devices, and an auxiliary motor connectable to one of said film feeders to move the same.

2. The combination as claimed in claim 1 wherein said auxiliary motor is movably mounted on said turret plate, whereby said last motor may be moved to engage and disengage the film feeder with which it is associated.

3. In combination, a cabinet, a turret plate revolvably mounted thereon, a lens carried by said plate, film feeders carried by said plate including rotatable shafts and adapted to move film transverse to the axis of said lens, motors carried by said plate and connected to said shafts, reeling devices including rotatable shafts carried by said plate and adapted to reel film delivered to said devices by said feeders, motors carried by said plate and connected to the shafts of said reeling devices, and an auxiliary motor adapted to engage one of said film feeders to move the same.

4. In a device of the character described, a pair of feeding motors, a pair of winding motors, means for energizing said winding motors to revolve in opposite directions to tension film moved thereby, means for energizing either of said feeding motors and for deenergizing one of said winding motors to permit film to be fed and wound by the energized feeding and winding motors while the deenergized feeding motor remains in that condition, and an auxiliary motor operatively connected to one of said feeding motors and operable independently thereof.

5. In a device of the character described, a pair of feeding motors, a pair of winding motors, means for energizing said winding motors to revolve in opposite directions to tension film wound thereby, means for energizing one of said feeding motors to feed film to one of said winding motors to be wound thereby while the other of said winding motors tensions said film to oppose said feeding movement, and an auxiliary motor operatively connected to one of said feeding motors to operate independently thereof to feed said film.

6. In a device of the character described, film feeding means including a pair of motors adapted when energized to tension a film extending between them, a circuit including said motors and a source of current, film winding means including a pair of motors adapted when energized to wind film in opposite directions, said motors being connected to said circuit, means for conjointly controlling said motors whereby one of each pair thereof may be simultaneously operated to feed and wind film, and an auxiliary motor operatively associated with said film feeding means to feed film thereby.

VERNEUR E. PRATT.
GEORGE F. GRAY.

REFERENCES CITED

The following references are of record in the file of this patent:

UNITED STATES PATENTS

| Number | Name | Date |
|---|---|---|
| 2,071,192 | Younts | Feb. 16, 1937 |
| 2,177,638 | Draeger | Oct. 31, 1939 |
| 2,316,780 | Foster | Apr. 20, 1943 |
| 2,365,691 | Fodor | Dec. 26, 1944 |
| 2,412,551 | Pratt et al. | Dec. 10, 1946 |

FOREIGN PATENTS

| Number | Country | Date |
|---|---|---|
| 459,035 | Great Britain | Dec. 31, 1936 |